United States Patent [19]

Neal et al.

[11] 4,295,559
[45] Oct. 20, 1981

[54] CONVEYOR SYSTEM WITH DIVERTER

[75] Inventors: Warren D. Neal; Robert N. Nicodemus, Jr., both of Walkersville, Md.

[73] Assignee: Acco Industries Inc., Trumbull, Conn.

[21] Appl. No.: 117,368

[22] Filed: Jan. 31, 1980

[51] Int. Cl.³ .................. B65G 47/34; B65G 47/82
[52] U.S. Cl. ............................................. 198/598
[58] Field of Search ............ 198/367, 372, 597, 598; 74/575, 576, 577 R, 577 S, 577 SF, 577 M

[56] References Cited

U.S. PATENT DOCUMENTS

| | | | |
|---|---|---|---|
| 2,941,628 | 6/1960 | McCloskey | 74/576 X |
| 3,026,988 | 3/1962 | Fisk | 198/597 X |
| 3,033,366 | 5/1962 | Atanasoff et al. | 198/367 X |
| 3,083,808 | 4/1963 | Graybeal | 198/598 X |
| 3,160,259 | 12/1964 | Dalton | 198/597 X |
| 3,212,623 | 10/1965 | Griffith | 198/597 X |
| 4,005,787 | 2/1977 | Sleep | 198/598 X |

Primary Examiner—James L. Rowland
Attorney, Agent, or Firm—Barnes, Kisselle, Raisch & Choate

[57] ABSTRACT

A conveyor system including a conveyor which is adapted to move articles past a predetermined area and a diverter device at said area for removing articles from the conveyor. The diverter device includes a ratchet which is shock mounted in order to hold the diverter at the initial position alongside the conveyor and to absorb energy when the parts of the diverter are stopped by the ratchet device. The diverter further includes a linear air cylinder that is mounted by a simple clevis mount and utilizes a crank arm which is offset from the top dead center of the air cylinder when the diverter is in the initial non-diverting position.

18 Claims, 11 Drawing Figures

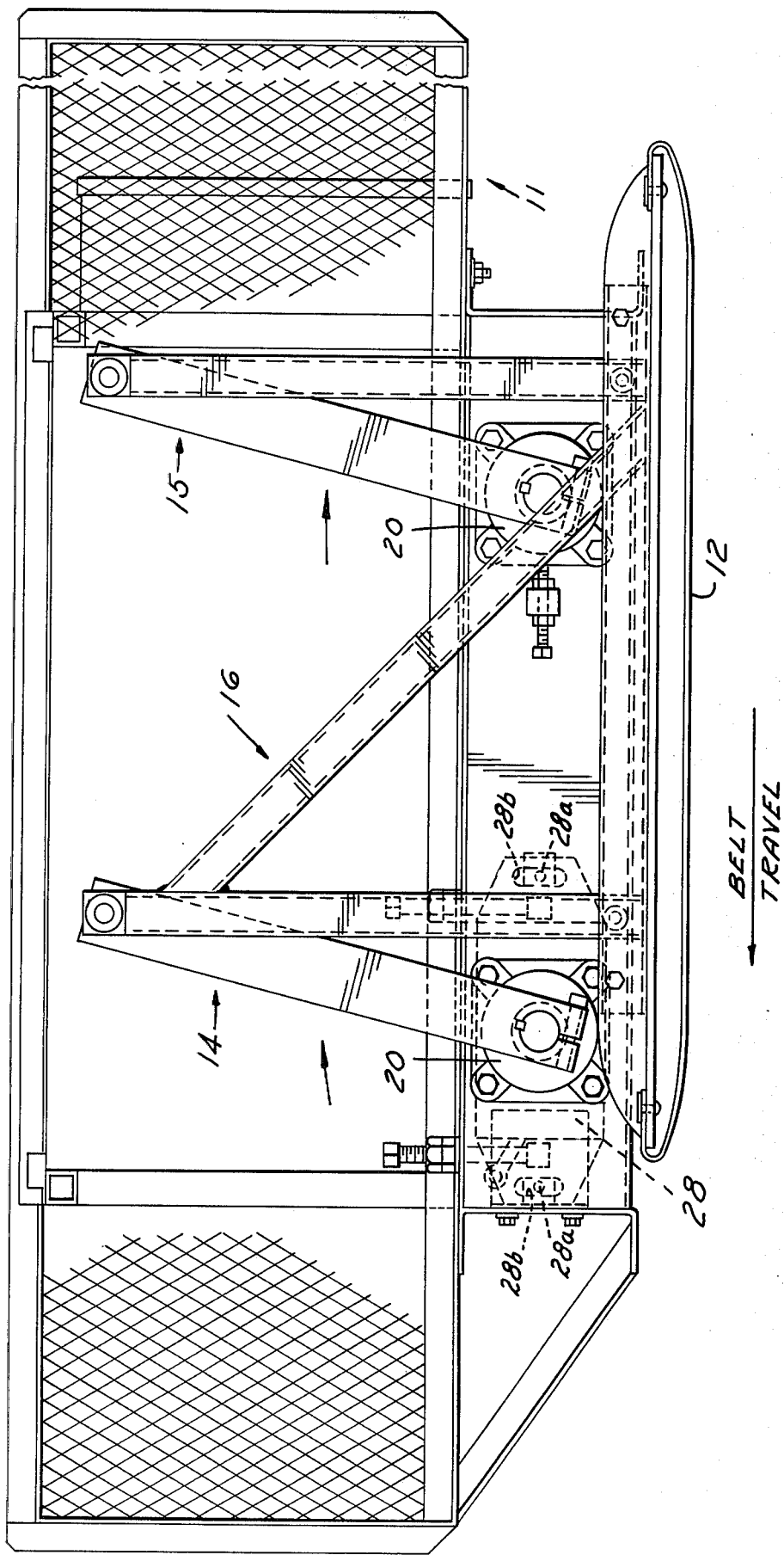

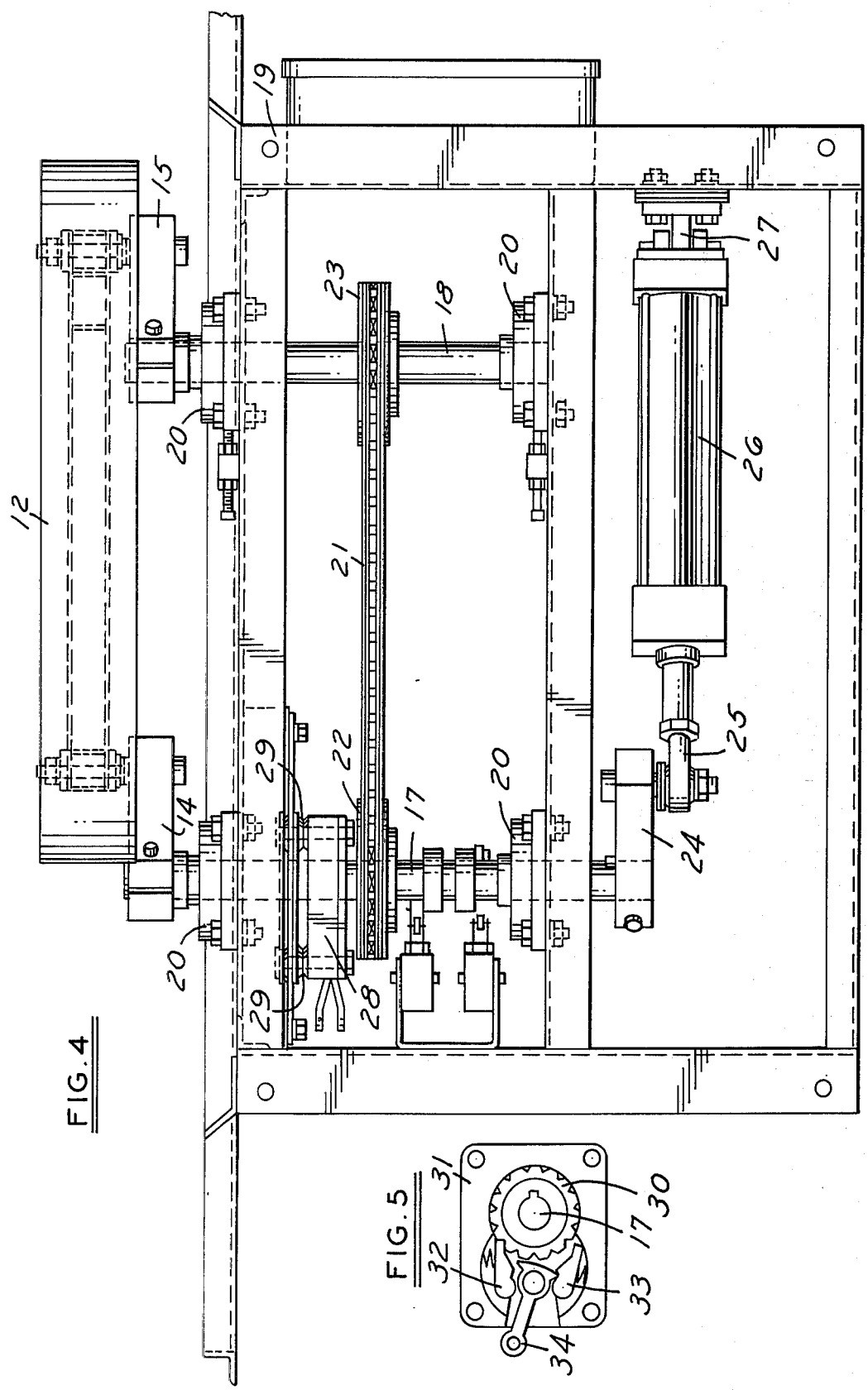

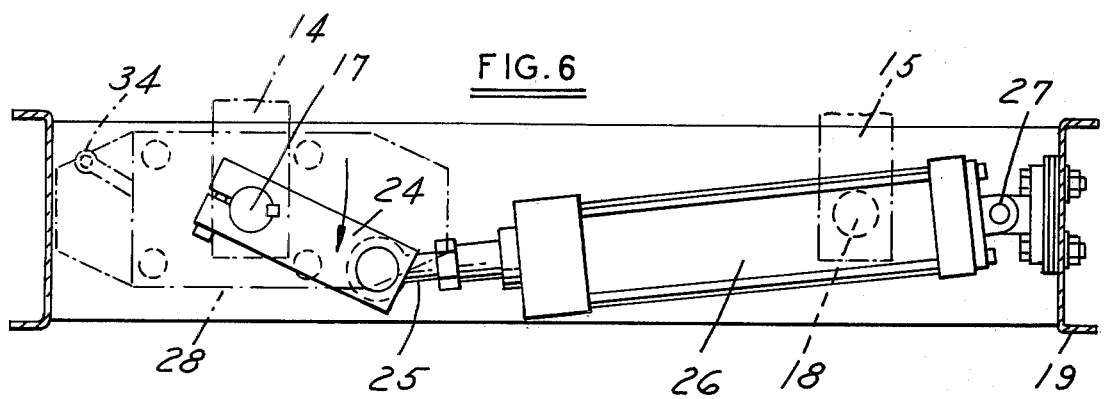
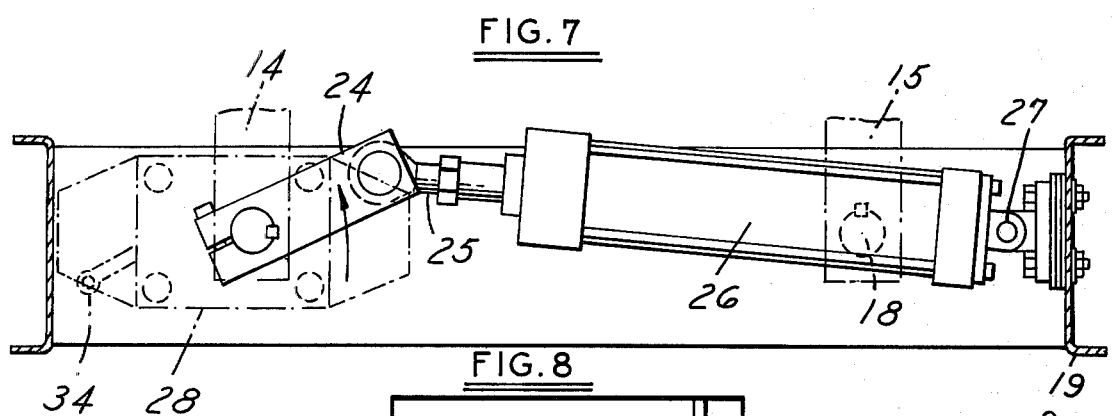
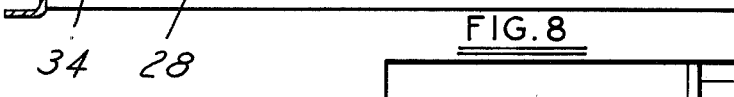
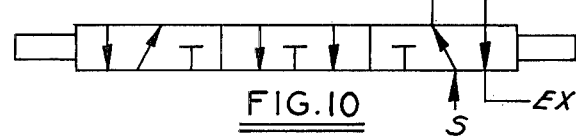
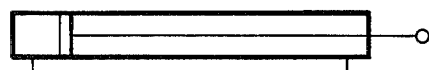
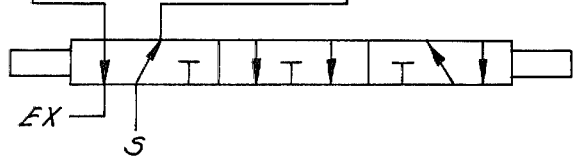

CONVEYOR SYSTEM WITH DIVERTER

This application relates to conveyor systems wherein articles are moved along a generally horizontal path and are diverted as desired at predetermined areas along the path.

BACKGROUND AND SUMMARY OF THE INVENTION

It is common in conveyor systems to utilize conveyors such as belts and the like which move articles along a horizontal path and to provide diverters along the path for removing the articles from the conveyor at predetermined points or areas along the path of the conveyor.

In the U.S. Pat. No. 3,033,366 issued May 8, 1962, there is disclosed and claimed a diverter which includes a paddle that is movable in a cycloid path, as contrasted to a straight transverse path, across the conveyor to remove articles from the conveyor. Such a system works quite effectively since the pusher or paddle portion of the diverter moves in a cycloid path that has an acceleration approaching a sine wave providing a high sorting capacity with lesser impact than a straight line diverter.

Among the objects of the present invention are to provide an improved conveyor system incorporating a diverter of the type disclosed in the aforementioned U.S. Pat. No. 3,033,366 which incorporates means for holding the paddle member of the diverter in positive position alongside the path, which has improved mechanical advantage, and which can be readily adapted for use along one or the other side of the conveyor.

DESCRIPTION OF THE DRAWINGS

FIG. 3 is a plan view on an enlarged scale of the diverter embodied in the system.

FIG. 4 is a fragmentary elevational view of the diverter shown in FIG. 3.

FIG. 5 is a cross sectional view of a portion of the ratchet clutch device. FIGS. 6 and 7 are views showing the different positions of portions of the diverter under different operating conditions.

FIGS. 8, 9 and 10 are schematic diagrams of the pneumatic circuit under different operating conditions.

DESCRIPTION

Figure 1:
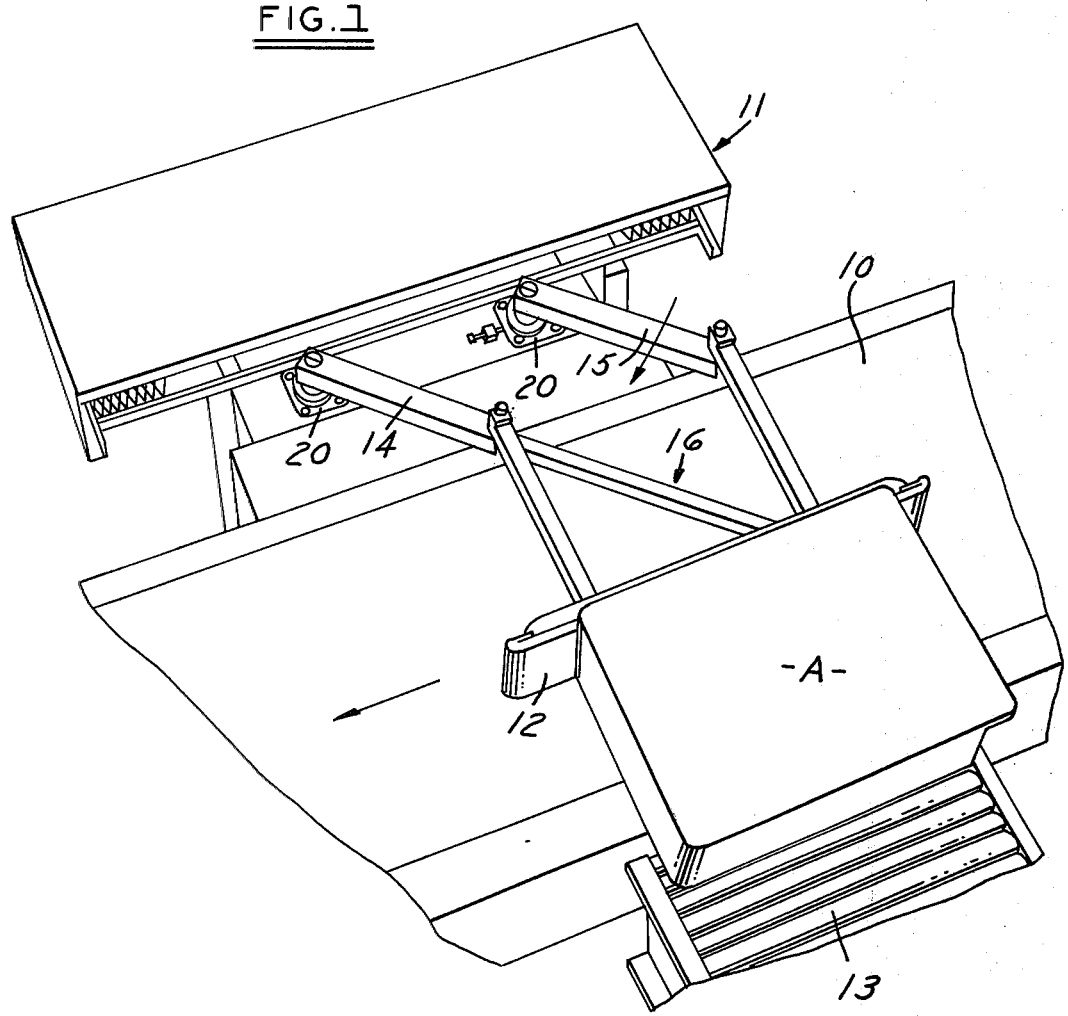
FIG. 1 is a perspective view of a conveyor system embodying the invention.
Figure 2:
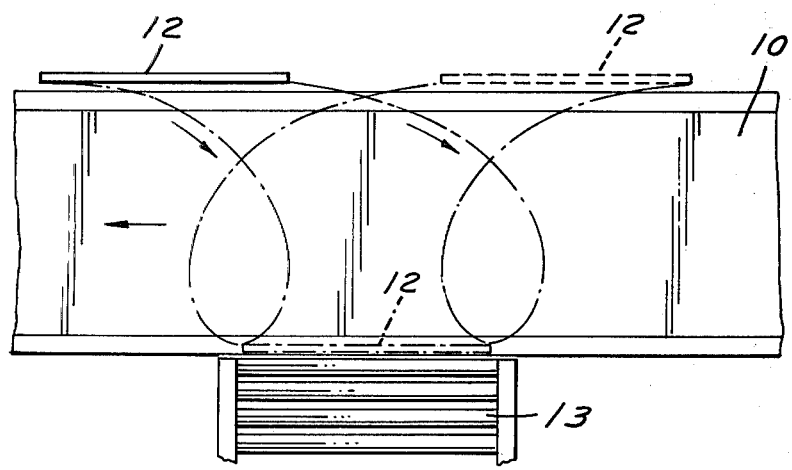
FIG. 2 is a diagrammatic plan view of the conveyor system.

Referring to FIG. 1, the conveyor system embodying the invention comprises an endless conveyor 10 such as a belt conveyor which is adapted to move articles A in a horizontal path. At one or more places along the conveyor, a diverter device 11 is positioned and includes a paddle 12 that is operable to move in a cycloidal path relative to the conveyor, as shown in FIG. 2, to divert an article A to a roller conveyor 13 or other receiving device such as a chute.

As shown in FIG. 3, the paddle member 12 is supported on arms 14, 15. More specifically, the paddle member 12 includes a sub-frame 16 that is pivoted to the ends of the arms 14, 15. As shown in FIG. 4, arm 14 is fastened to the upper end of a drive shaft 17 while arm 15 is fastened to the upper end of a driven shaft 18. The shafts 17, 18 are journalled in a frame 19 by bearings 20. An endless chain 21 is trained over sprockets 22, 23 between the drive shaft 17 and driven shaft 18 to control the simultaneous drive of the shafts 17 and 18. A crank arm 24 is provided on the lower end of the drive shaft 17 and is connected to the shaft 25 of the piston of an air cylinder 26. The cylinder 26 is mounted on the frame 19 by a simple clevis mount 27. In order to provide an anti-backup for the paddle member 12 when it is in the home position alongside the conveyor, ratchet device 28 is provided and associated with the drive shaft 17. The ratchet device 28 is mounted on the frame 19 by rubber mounts 29. In FIG. 3, the paddle arms 14, 15 are shown at an angle, but in the home position of the paddle 12, the arms 14, 15 are at a right angle to the path of the conveyor. In order to adjust the ratchet 28 so that it is engaged when the arms 14, 15 and paddle 12 are in the home position, the ratchet device 28 is adjustably mounted on frame 19 by bolts 28a that extend through elongated slots 28b in the device 28.

As shown in FIG. 5, the ratchet device comprises a gear 30 having a plurality of teeth mounted in a housing 31 and spaced spring-loaded pawls 32, 33 which are adapted to be selectively engaged by a lever 34 for bi-directional rotation. Such a device is commercially available and sold by Lowell, 97 Temple St., Worcester, Mass. In the position of lever 34 shown in FIG. 5, the top pawl 32 is engaged and rotation of shaft 17 is clockwise as viewed from the top. If lever 34 is moved to the lower position, the bottom pawl 33 is engaged and rotation of shaft 17 is counterclockwise.

As shown in FIGS. 6 and 7, the crank arm is provided at an angle, preferably approximately 24° from the top dead center of the air cylinder when the ratchet is engaged in the home position. When the diverter device is to be used on the opposite side of the conveyor, the crank arm is reversed as shown in FIG. 7 and the operating arm of the ratchet device is switched from one position to the other to provide an anti-backup function for the paddle member in the opposite direction.

The control of the operation of the cylinder is by means of a dual solenoid operated valve shown in various positions in FIGS. 8, 9 and 10. In the position shown in FIG. 8, the "out" solenoid is operated and the air cylinder is shown approaching its outermost position. In the position shown in FIG. 9, the "in" solenoid has been energized and the cylinder is shown approaching its home or in position. In the position shown in FIG. 10, the stall timer TR-1 has timed out and both solenoids are de-energized causing the air valve to shift to its mid position.

Figure 11:
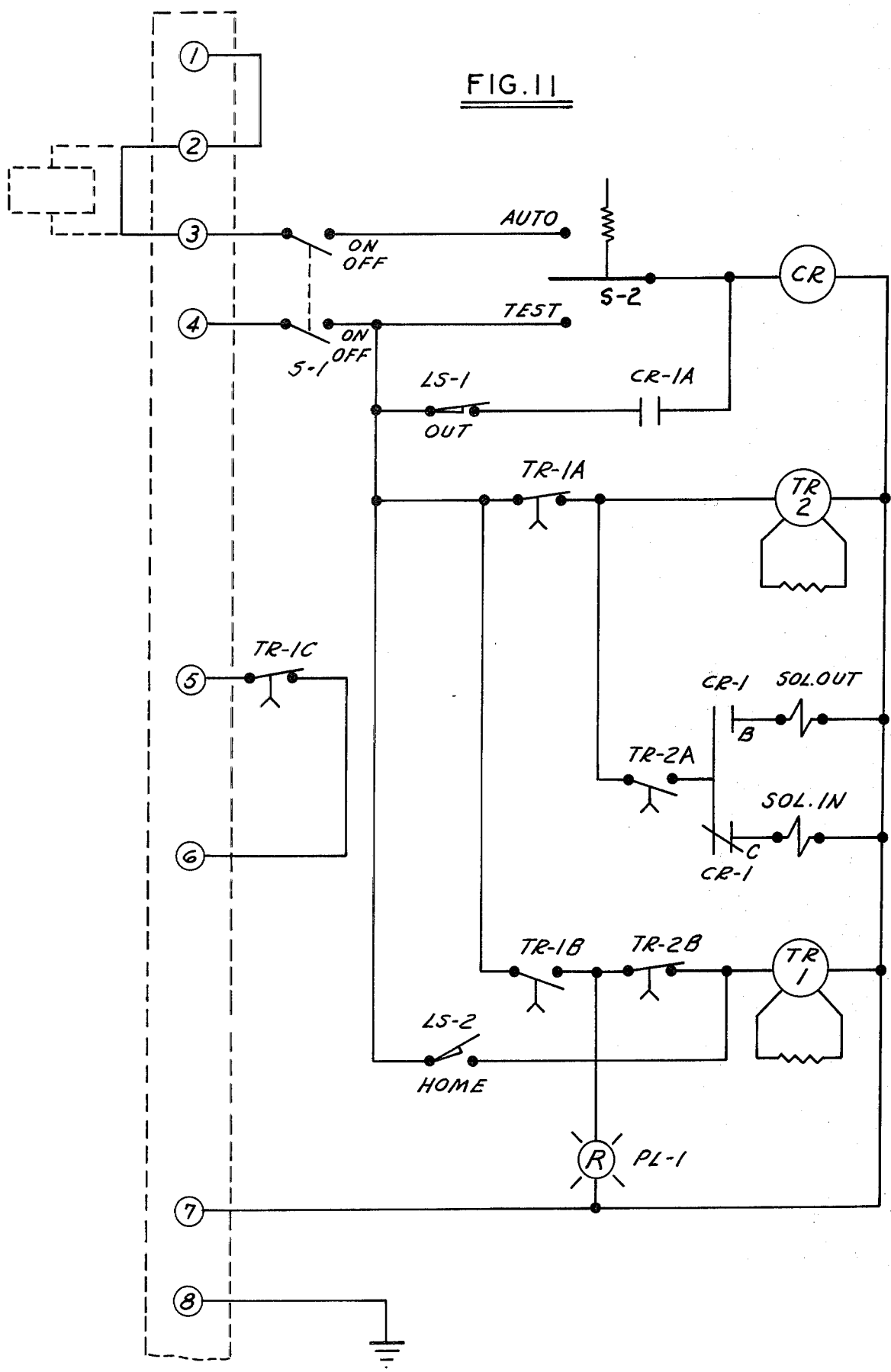
FIG. 11 is a schematic wiring diagram.

FIG. 11 represents the schematic wiring diagram for the system. The circuit includes the following components:

| | |
|---|---|
| S1 | Toggle Switch 2 position (ON-OFF) disconnects all control voltage from control circuits |
| S2 | Toggle Switch 3 position (AUTO-OFF-TEST) used to manually test and make adjustments to diverter |
| CR-1 | Control Relay Diverter Cycle Control |
| TR-1 | Timing Relay Diverter Stall Control |
| TR-2 | Timing Relay Stall Latch Safety Control |
| LS-1 | Limit Switch Maximum Extension of Diverter |
| LS-2 | Limit Switch |

| | -continued |
|---|---|
| PL-1 | Home Position of Diverter<br>Panel Light<br>Diverter Stall |

Control voltage is applied at terminals four (4) and seven (7). Diverter Cycle Control at terminal one (1) should be approximately 50 MS momentary signal. With switch S1 in the ON position and switch S2 in the AUTO position, a mementary external cycle signal will energize relay CR-1. CR-1A contact will seal in relay CR-1, CR-1B contact will energize the OUT solenoid and CR-1C contact will de-energize the IN solenoid.

As the diverter paddle moves from the home position, limit switch LS-2 will start timing relay TR-1 timing. When the paddle is fully extended (FIG. 8), limit switch LS-1 will activate, opening the seal circuit to relay CR-1 through contact CR-1A, de-energizing relay CR-1. Contact CR-1B will open de-energizing the OUT solenoid and contact CR-1C will close energizing the IN solenoid. The diverter paddle will now return to the home position (FIG. 9) activating limit switch LS-2 and resetting relay TR-1 which completes the cycle.

If the diverter paddle does not return to its home position for the duration of time of timing relay TR-1, the TR-1A contact will open removing power to the IN and OUT solenoids which de-energizes timing relay TR-2. Contact TR-2B will close and contact TR-1B will close sealing in timer TR-1 and illuminating indicator light PL-1. An auxiliary contact TR-1C will also open turning off any remote conveyors or equipment associated with the diverter.

To reset this stalled condition, switch S1 is turned to OFF and the push diverter paddle is moved to home position. Switch S1 is turned to ON and the diverter is tested with switch S2 to verify that the diverter is free and working properly. Then switch S2 is placed on AUTO. The diverter is now ready for normal operation.

The time delay for timer TR-2 is always set longer than the time for timer TR-1 so that if the diverter paddle is not in the home position when the switch S1 is turned to the ON position, or when someone re-connects the air supply, the TR-1 stall timer will time out and deactivate the diverter before any air pressure is applied to the cylinder. In this mode, power cannot be applied to the IN or OUT solenoids of the four-way air valve and the valve spool spring centers to the position shown in FIG. 10 which exhausts air pressure from both sides of the air cylinder. This is a significant safety feature of this circuitry.

We claim:
1. A conveyor system comprising
  a conveyor having a horizontal surface upon which articles move past a given area,
  diverter means adjacent said area for removing said articles from the conveyor comprising a paddle member,
  means for mounting said paddle member for movement in an arcuate path over said conveyor to engage articles on the conveyor and remove them from the conveyor,
  and means for operating said last-mentioned means in a cycle,
  said last-mentioned means including anti-backup ratchet means operable to hold the paddle member in a predetermined position alongside the conveyor, a drive shaft, said ratchet means being mounted on said frame and operating on said drive shaft and a linear type air motor operable on the drive shaft.

2. The conveyor system set forth in claim 1 wherein said motor comprises a cylinder, a piston and a piston shaft,
  a clevis mount mounting said cylinder on said frame,
  and means interconnecting said piston shaft with said drive shaft comprising a crank arm.

3. The conveyor system set forth in claim 2 wherein said crank arm is offset from top dead center of said cylinder when said ratchet means is engaged at the initial non-diverting position.

4. The conveyor system set forth in claim 3 wherein said offset is approximately 24° from top dead center.

5. The conveyor system set forth in claim 3 wherein said ratchet means comprises a member having a plurality of teeth thereon mounted on said drive shaft and a spring loaded pawl engaging said teeth to prevent movement in one direction.

6. The conveyor system set forth in claim 5 wherein said ratchet means includes control means so that the ratchet can be selectively engaged to operate in one or the other direction when the crank arm is removed and installed in the inverted position such that the diverter means can be placed along one or the other side of said conveyor.

7. The conveyor system set forth in claim 1 including means for shock mounting said ratchet means for absorbing energy when said ratchet means is engaged.

8. A conveyor system comprising
  a conveyor having a horizontal surface upon which articles move past a given area,
  diverter means adjacent said area for removing said articles from the conveyor comprising a paddle member,
  means for mounting said paddle member for movement in an arcuate path over said conveyor to engage articles on the conveyor and remove them from the conveyor,
  and means for operating said last-mentioned means in a cycle,
  said last-mentioned means including anti-backup ratchet means operable to hold the paddle member in a predetermined position alongside the conveyor,
  and means for shock mounting said ratchet means for absorbing the energy when said ratchet means is engaged,
  said means for supporting said paddle member comprising
  a pair of spaced arms,
  a frame,
  means for mounting said arms on said frame,
  said last-mentioned means comprising a driven shaft on which one of said arms and a drive shaft on which the other of said arms is mounted, and an air motor operable to drive said drive shaft,
  endless power means extending between said shafts,
  said ratchet means being mounted on said frame by said shock mounting means and operable on said drive shaft,
  said motor being of the linear type.

9. The conveyor system set forth in claim 8 wherein said motor comprises a cylinder, a piston and a piston shaft, a clevis mount mounting said cylinder on said frame, and means interconnecting said piston shaft with said drive shaft comprising a crank arm.

10. The conveyor system set forth in claim 9 wherein said crank arm is offset from top dead center of said cylinder when said ratchet means is engaged at the initial non-diverting position.

11. The conveyor system set forth in claim 10 wherein said offset is approximately 24° from top dead center.

12. The conveyor system set forth in claim 10 wherein said ratchet means comprises a member having a plurality of teeth thereon mounted on said drive shaft and a spring loaded pawl engaging said teeth to prevent movement in one direction.

13. The conveyor system set forth in claim 12 wherein said ratchet means includes control means so that the ratchet can be selectively engaged to operate in one or the other direction when the crank arm is removed and installed in the inverted position such that the diverter means can be placed along one or the other side of said conveyor.

14. The conveyor system set forth in claim 8 wherein said ratchet means includes control means so that the ratchet can be selectively engaged to operate in one or the other direction such that the diverter means can be placed along one or the other side of said conveyor.

15. The conveyor system set forth in claim 8 including means for adjusting said ratchet means toward and away from said conveyor when said ratchet means is engaged at the home position of said diverter.

16. A conveyor system comprising a conveyor having a horizontal surface upon which articles move past a given area, diverter means adjacent said area for removing said articles from the conveyor comprising a paddle member, means for mounting said paddle member for movement in an arcuate path over said conveyor to engage articles on the conveyor and remove them from the conveyor, and means for operating said last-mentioned means in a cycle, said means for supporting said paddle member comprising a pair of spaced arms, a frame, means for mounting said arms on said frame, said last-mentioned means comprising a driven shaft on which one of said arms and a drive shaft on which the other of said arms is mounted, endless power means extending between said shafts, an air motor operable to drive said drive shaft, said air motor being of the linear type, said air motor comprising a cylinder, a piston and a piston shaft, a clevis mount mounting said cylinder on said frame, and means interconnecting said piston shaft with said drive shaft comprising a crank arm.

17. The conveyor set forth in claim 14 including ratchet means operable to hold the paddle member in a predetermined position alongside the conveyor, said crank arm being offset from top dead center of said cylinder when said ratchet is engaged at the initial non-diverting position.

18. The conveyor system set forth in claim 17 wherein said offset is approximately 24° from top dead center.

* * * * *